United States Patent [19]
Henry et al.

[11] Patent Number: 5,791,755
[45] Date of Patent: Aug. 11, 1998

[54] GOBO HANDLER APPARATUS

[75] Inventors: Patrick L. Henry, Lakewood; Kenneth R. Fasen, Colorado Springs, both of Colo.

[73] Assignee: Wybron Incorporated, Colorado Springs, Colo.

[21] Appl. No.: 748,988

[22] Filed: Nov. 14, 1996

[51] Int. Cl.⁶ .................................................. G03B 21/14
[52] U.S. Cl. ........................... 353/120; 362/284; 362/277
[58] Field of Search ............................... 353/120, 62, 80; 362/277, 281, 293, 280, 307, 311, 806, 807, 808

[56] References Cited

U.S. PATENT DOCUMENTS

| | | | |
|---|---|---|---|
| 4,392,187 | 7/1983 | Bornhorst | 362/233 |
| 4,602,321 | 7/1986 | Bornhorst | 362/268 |
| 4,800,474 | 1/1989 | Bornhorst | 362/293 |
| 4,843,528 | 6/1989 | Pearce-Harvey et al. | 353/35 |
| 4,897,770 | 1/1990 | Solomon | 362/293 |
| 4,914,556 | 4/1990 | Richardson | 362/293 |
| 4,984,143 | 1/1991 | Richardson | 362/293 |
| 5,126,886 | 6/1992 | Richardson et al. | 359/888 |
| 5,198,939 | 3/1993 | Hewett | 359/889 |
| 5,402,326 | 3/1995 | Belliveau | 362/284 |
| 5,416,681 | 5/1995 | Wu | 362/277 |
| 5,450,148 | 9/1995 | Shu et al. | 353/42 |
| 5,537,303 | 7/1996 | Stacy | 362/284 |

OTHER PUBLICATIONS

Rosco, Spring 1996, Products List Catalog, pp. 8,9,18,19.

Primary Examiner—William Dowling
Attorney, Agent, or Firm—John R. Wahl; William J. Kubida; Holland & Hart LLP

[57] ABSTRACT

A gobo handling apparatus for use in a spotlight is disclosed. The spotlight has a housing supporting a light source producing a light beam and supporting at least one focusing lens. The spotlight includes an iris slot through the housing proximate the focal plane of the light beam. The apparatus of the invention comprises an elongated gobo housing removably inserted in the slot. The gobo housing has a central axis and an aperture therethrough for passage of the light beam in a direction normal to the gobo housing axis. The housing has a plurality of generally disk shaped gobo carriers each supporting a gobo, arranged side by side and movably contained within the housing. A drive mechanism contained within the housing operatively engages each of said plurality of gobo carriers for independently translating the gobo members along the housing axis into and out of the spotlight beam and rotating the gobo carrier in the spotlight beam in response to a remote control signal. The drive mechanism is driven by at least one motor attached to the housing for operating the mechanism in response to the remote control signal.

21 Claims, 11 Drawing Sheets

GOBO HANDLER APPARATUS

BACKGROUND OF THE INVENTION

1. Field of the Invention

This invention generally relates to lighting fixtures and more particularly to a gobo, or pattern handling apparatus for a theatrical light.

2. Description of Related Art A "gobo" is a sheet of material with a pattern, object stencil or figure outline cut through the sheet and placed in front of a powerful light fixture used to project a shadow pattern or figure of the cutout onto background theatrical scenery. The lights used are sometimes thus called pattern projectors. The particular theatrical lights used are typically ellipsoidal pattern spotlights. The gobo goes between the light and the on-stage action, giving rise to the short nick name "gobo". The theatrical gobo itself is a thin metal or glass plate which is typically round, with the stencil pattern centered therein. The gobo is carried in a thin sheet metal folder or holder which has a circular cutout. The stencil cutout of the gobo is centered in this holder cutout and the holder is slipped into the beam of light preferably so that the gobo is in the focal plane of the beam, very close to the shutters of the spotlight.

Since steel gobos are very thin, and they carry a significant amount of heat in the light beam, they often get red hot in use and tend to wear out with continued use. Also, if the pattern is intricate, with thin lines, such as an intricate tree silhouette, the lifetime may be very limited. An alternative is to use a glass substrate for the pattern. The glass gobos are much sturdier than the steel, but take longer to make and are bulkier, i.e. thicker as well as more costly.

Typical ellipsoidal spotlights available today have a drop in iris slot adjacent the set of shutter blades at the focal plane. This slot is typically about ½ inch wide and has an adjustable cover plate to compensate for various metal gobo holders or glass gobo holder thicknesses.

The theatrical ellipsoidal spotlights generate a great deal of heat at the focal plane in the light assembly. Consequently, the gobo is typically made of thin stainless steel which can withstand this heat. Often the gobos get red hot in the beam, and since they are usually adjusted by hand, great care in handling these elements is required, to prevent burns.

To solve this handling problem, and to facilitate movement effects of the background shadows created by the gobo, a remote controlled gobo rotator such as the Gobo Rotator, marketed by Rosco, 36 Bush Avenue, Port Chester, N.Y. 10573, may be used instead of the basic sandwich gobo holder described above. This rotator is basically an elongated carrier which supports a gobo holder at one end in the iris slot of the spotlight. The gobo holder has a geared outer perimeter around the central cutout, and a AC or DC motor fastened to the other end of the carrier. The motor drives a gear which in turn engages the gear teeth on the perimeter of the gobo holder. When the motor is energized, the gobo can be rotated in either direction. The motor direction is in turn remotely controlled from the light board or control console usually located either backstage or in the audience seating area.

A remotely controlled gobo handler apparatus is disclosed in U.S. Pat. No. 4,392,187. The apparatus in this patent includes a disc or wheel which has a set of gobos arranged around the center of the wheel which rotates about an axis parallel to the beam axis with a motor controlling the rotational position of the wheel. The wheel is positioned in the spotlight housing such that each one of the gobos may be positioned in the light beam by rotating the wheel. This apparatus does not permit rotation of the gobo in the light beam and/or linear translation of the gobo through the light beam.

A major disadvantage of conventional gobo holders is that they must be inserted and removed by hand. As mentioned above, these gobos are hot and remain hot after the light is extinguished for a significant amount of time. Great care must be taken to prevent burns while handling. Another disadvantage is that remote gobo handlers only rotate the gobo about the spotlight beam axis. There is no way, for example, to slowly translate an image across the scenery in a straight line, such as a moon setting, vehicle shadows passing in the distance, etc. except to manually move the spotlight.

Remotely controlled color filter apparatuses for use in spotlights have been developed for changing color hues projected by theatrical lighting fixtures. Examples of such devices are disclosed in the patent just discussed and in U.S. Pat. Nos. 4,602,321; 4,800,474.; 4,897,770; 4,914,556; 4,984,143; and 5,126,886. These devices rotate or translate filter combinations into and out of the light beam downstream of the focal plane of the beam in order to provide continuous and gradual color changes. They are not used to rotate and translate an image in the light beam.

There is often a need for images such as silhouettes on background scenery to move. However, there currently is no apparatus that readily permits remote movement of the projected silhouette in a non-circular trajectory. In addition, there is a need for an apparatus which remotely changes gobos and/or both rotates and translates gobos in the light beam. There is also a need for a gobo handler that can be readily utilized with conventional theatrical spotlight assemblies without substantial modifications to the assemblies.

SUMMARY OF THE INVENTION

The present invention is specifically addresses the above mentioned needs. It is therefore an object of the invention to provide a gobo handling apparatus which can be installed in conventional spotlights.

It is another object of the invention to provide a gobo handling apparatus that selectively translates and rotates a plurality of gobos into and out of a beam of light.

It is another object of the invention to provide a gobo handling apparatus that can remotely translate and rotate a gobo in and out of a beam of light.

The gobo handling apparatus of the present invention is a remotely controlled apparatus which is installed at the focal plane in the iris slot of a conventional theatrical spotlight and which carries a plurality of gobos in side by side relation. The apparatus can remotely translate each of the gobos into and out of the light beam and rotate the gobo in the beam. In addition, this translation and rotation may be performed at the same time in the light beam. This gives the lighting director the capability of providing movement of the silhouette projected onto background scenery in many different directions.

The apparatus comprises an elongated handler housing which is removably insertable through iris slots in or adjacent the focal plane of the light beam in the spotlight body. The handler housing is preferably a rectangular tube having a central axis and an aperture therethrough for passage of the light beam in a direction normal to the axis of the apparatus housing. This aperture is preferably located about mid way between the ends of the housing.

A conventional theatrical spotlight typically only has an iris slot on one side of the spotlight body. Consequently, to accommodate the elongated housing of the present invention, an identical slot is machined in the spotlight body diametrically opposite to the iris slot. The elongated housing of the apparatus of the invention can then be inserted through these slots so that the aperture is centered in the light beam. The handler housing is then fastened to the spotlight body with a thumbscrew.

The elongated handler housing carries a plurality of gobo carriers arranged side by side within the housing. Each gobo carrier is operably connected to a drive mechanism also contained within the housing which can independently or simultaneously translate and rotate the gobo carriers into and out of the aperture, and thus the gobo, in the light beam in response to a remote control signal. At least one and preferably two motors are attached to the housing and connected to the drive mechanism for operating the mechanism in response to the remote control signal.

Each gobo is supported in a generally annular disk shaped cartridge or carrier that engages the drive mechanism. The carrier is preferably an annular plate with retainer springs to hold the gobo centered in the carrier.

One embodiment of the drive mechanism includes a pair of endless toothed belts extending parallel to each other above and below the row of gobo carriers engaging diametrically opposite peripheral portions of each gobo carrier. In this embodiment, each carrier has matching teeth around the periphery of the carrier having a pitch complementary to those of the toothed belts.

Another embodiment of the drive mechanism includes a pair of parallel lead screws in the housing positioned above and below the plurality of gobo carriers. In this embodiment, each carrier has teeth around the periphery of the carrier having a pitch complementary to the pitch of the lead screw. When both lead screws are rotated in the same direction, the carriers are translated in one direction. When the lead screws are rotated in opposite directions, the carriers are rotated. When the lead screws are rotated at different speeds, the carriers are both translated and rotated.

Another embodiment of the invention includes the handler housing above described but which permits only translation of the gobos. This embodiment includes a single rectangular carrier placed in the housing. The carrier has a plurality of side by side apertures therethrough to carry a plurality of gobos side by side. The carrier has teeth along a portion of one edge which engage threads on one of the lead screws or teeth on one of the drive belts of the drive mechanism.

Each of these preferred embodiments of the invention includes either a stepper motor or servo motor mechanically connected to the drive belt or lead screw and can be remotely operated from the theater light board or control computer to automatically position and move the gobos as required at the proper time and in the proper sequence.

These and other objects, features and advantages of the present invention will become more apparent from a reading of the following detailed description when taken in conjunction with the attached drawing figures.

DETAILED DESCRIPTION OF THE INVENTION

Figure 1:
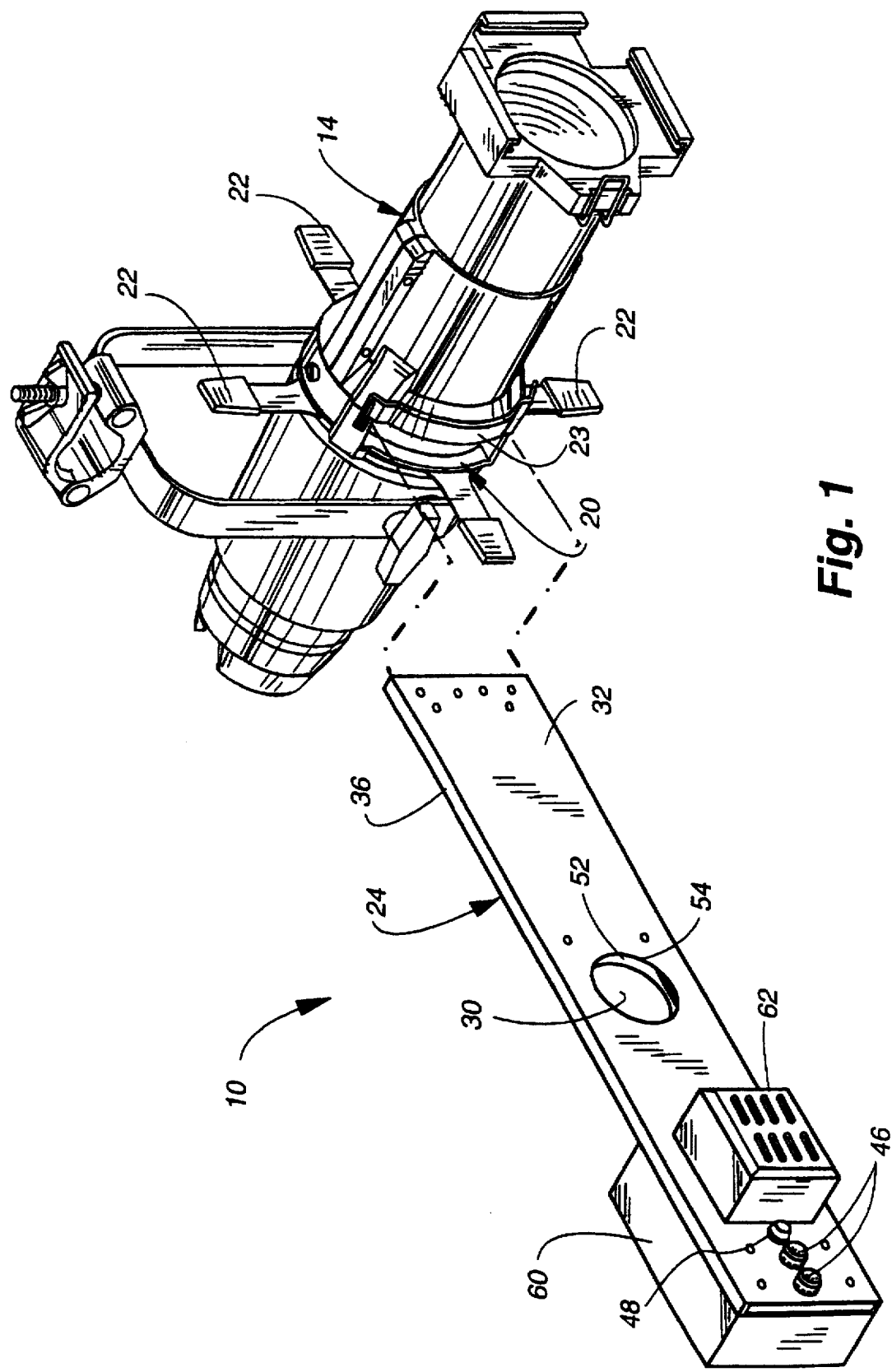
FIG. 1 is a perspective view of a gobo handler apparatus in accordance with a first embodiment of the present invention positioned for insertion in a theatrical spotlight.
Figure 2:
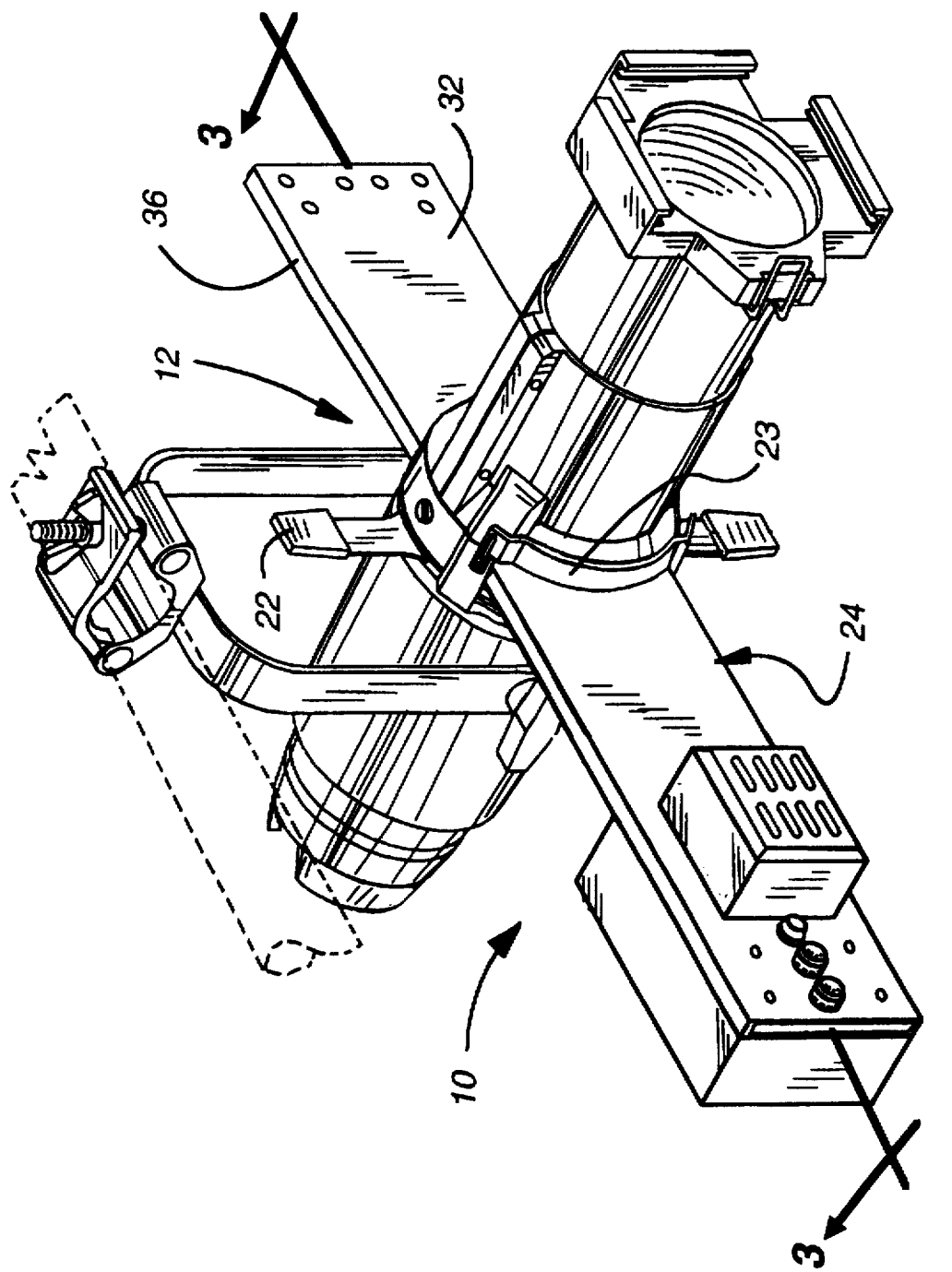
FIG. 2 is a perspective view of the gobo handler apparatus in FIG. 1 installed in the theatrical spotlight.

Referring now to the drawing, a first embodiment of the gobo handling apparatus 10 in accordance with the invention is shown in a perspective view adjacent a theatrical spotlight 12 in FIG. 1. The spotlight 12 is preferably an ellipsoidal, fixed focus spotlight having an elongated, generally hollow tubular spotlight housing 14, a light source 16 at one end of the housing 14, a central beam axis extending from the light source 16, and through a focusing lens 18 on the axis near an opposite open end of the housing and an iris slot 20 proximate the focal plane of the spotlight 12. A set of manually adjustable shutter blades 22 is positioned between the source 16 and the iris slot 20.

The spotlight 12 may be a ETC Source Four Spotlight, or any other commercially available theatrical light which accommodates gobos at or very close to the focal plane of the light. The Source Four Spotlight, for example, has a single iris slot 20 through one side of the housing 14 proximate the focal plane. The housing 14 of this spotlight must be modified by cutting an identical iris slot 20 diametrically opposite the iris slot 20. The iris slot 20 in the housing 14 is preferably about ½ inch wide and 4 inches long to accommodate a variety of sizes of gobo carriers. To minimize stray light leakage from the iris slot 20, an adjustable shield 23 is fastened to the outer surface of the spotlight housing 14. This shield 23 may be positioned to completely cover the slot 20 when a gobo is not installed, or positioned against the side of the gobo holder when one is installed. The identical iris slot on the other side of the housing 14, which is not shown, is the same size and is preferably also fitted with a similar adjustable light shield 23.

Figure 3:
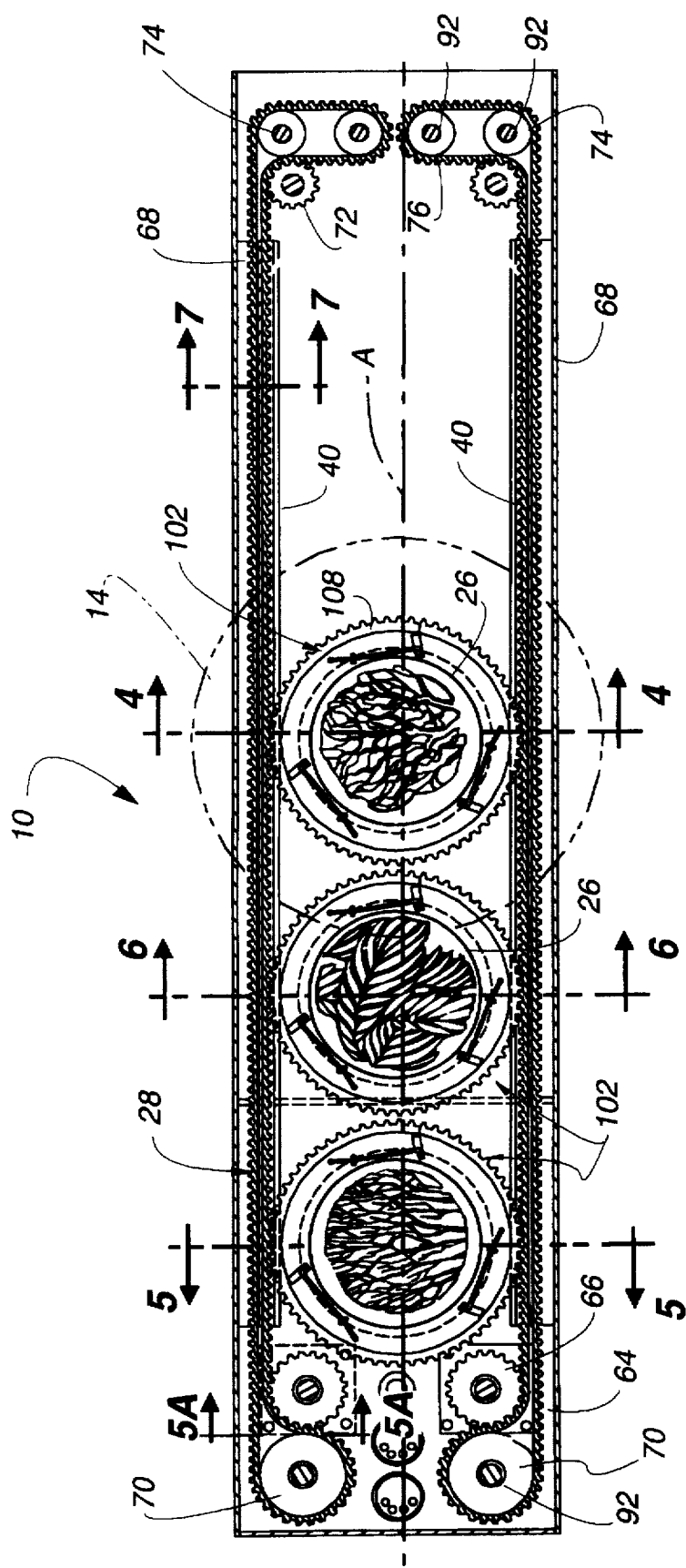
FIG. 3 is a longitudinal sectional view of the gobo handler apparatus shown in FIGS. 1 and 2 taken along the apparatus central axis as viewed along the line 3—3 in FIG. 2.
Figure 4:
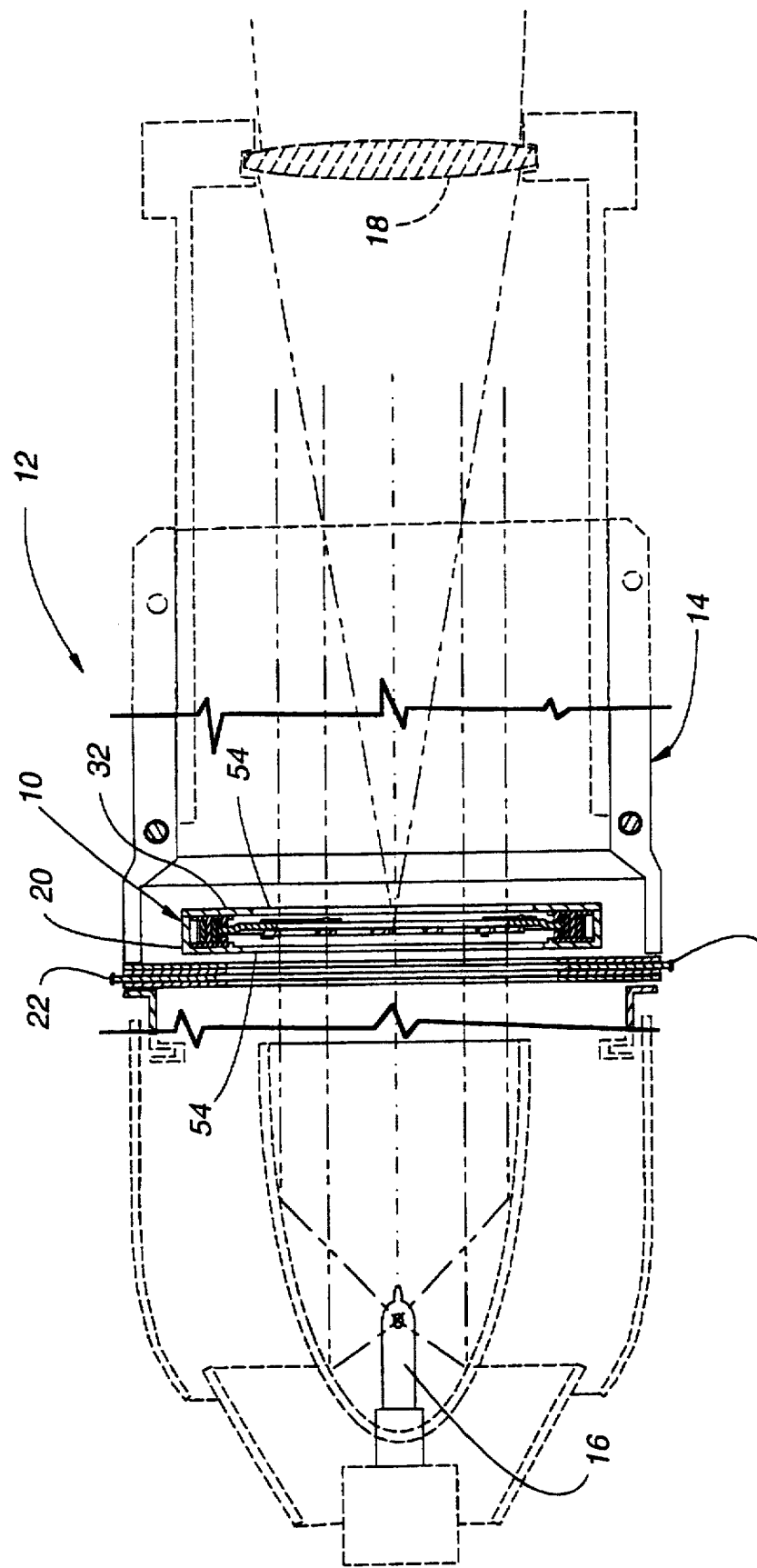
FIG. 4 is a sectional view of the gobo handler apparatus installed in the spotlight, partially shown in phantom, with the section taken on the line 4—4 in FIG. 3.
Figure 6:
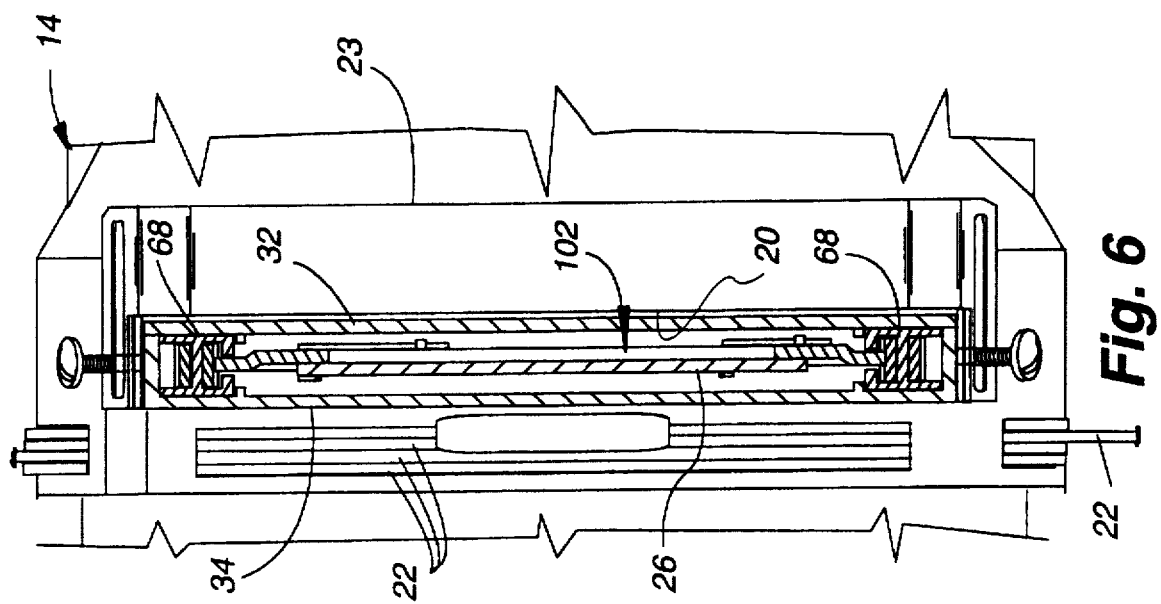
FIG. 6 is a sectional view of the apparatus shown in FIGS. 1 through 3 taken along the line 6—6 in FIG. 3.

The first embodiment is she gobo handler apparatus 10 of the invention is shown in FIGS. 1 through 10. A second embodiment is shown in FIGS. 11 through 15. The gobo handler apparatus 10 in accordance with the first embodiment of the invention is shown spaced from the spotlight 12 in FIG. 1 and installed through the slots 20 in FIG. 2. The apparatus 10 includes an elongated, generally rectangular, extruded housing 24, a plurality of gobos 26, three for example, as is shown in FIG. 3, supported in the housing 24 for movement of the gobos back and forth along a central axis A through the housing 24, and a drive mechanism 28 also in the housing 24. The drive mechanism 28 translates and rotates the gobos 26 into, through and/or out of position in a central aperture 30 through the housing 14. When the apparatus 10 is properly installed in the iris slots 20 of the spotlight housing 14, the central aperture 30 is centered about the axis in the light beam. Thus the gobos may be translated and/or rotated into, through, and out of the light beam. The light beam, in turn, typically projects the image created by the gobo in the beam onto a background scrim or scenery surface.

The rectangular tubular housing 24 is preferably a single extruded body made of aluminum. Housing 24 preferably includes a rectangular front wall 32, a rectangular rear wall 34, a top wall 36, and a bottom wall 38. The front and rear walls 32 and 34 each have an inwardly projecting retaining rib 40 spaced from each of the top and bottom walls and extending parallel to central axis A. These ribs are used to retain a drive belt guide as described in more detail below. The inside distance between the parallel front and back walls 32 and 34 is approximately ½ inch, less the wall thickness of the walls. The overall thickness is dictated by the existing iris slot width in conventional spotlights, in order to minimize the modifications which must be made to these conventional light assemblies in order to accommodate the handling apparatus of the present invention.

The housing 24 encloses the drive mechanism 28 and provides a support platform for external components including a pair of stepper motors 42, an associated electronic circuit board 44 for the motors 42, a pair of external connectors 46, a fuse 48 and a cooling fan 50.

The front wall 32 of the apparatus housing 24 has a central beam and gobo access aperture 52 therethrough having a first diameter. The rear wall similarly has a central beam aperture 54 therethrough having a second diameter smaller than the first diameter and coaxially positioned behind the access aperture 52. These two apertures are coaxially aligned on an axis normal to the housing central axis A. This normal axis corresponds to the light beam axis when the housing 24 of the gobo handler apparatus 10 is properly installed through the slots 20 in the spotlight 12. The apertures 52 and 54 are centered in the light beam in order to properly position a gobo in the focal plane and centered in the light beam.

Figure 5:
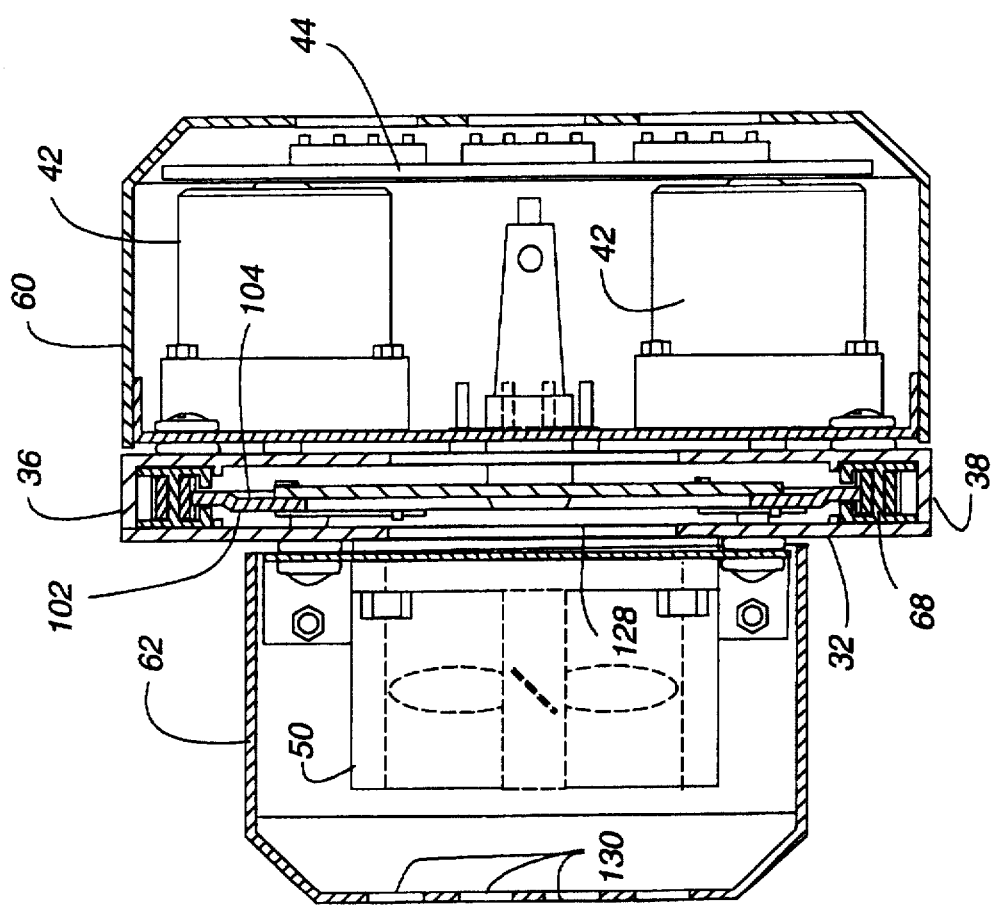
FIG. 5 is a sectional view of the apparatus shown in FIGS. 1 through 3 taken along the line 5—5 in FIG. 3.
Figure 5A:
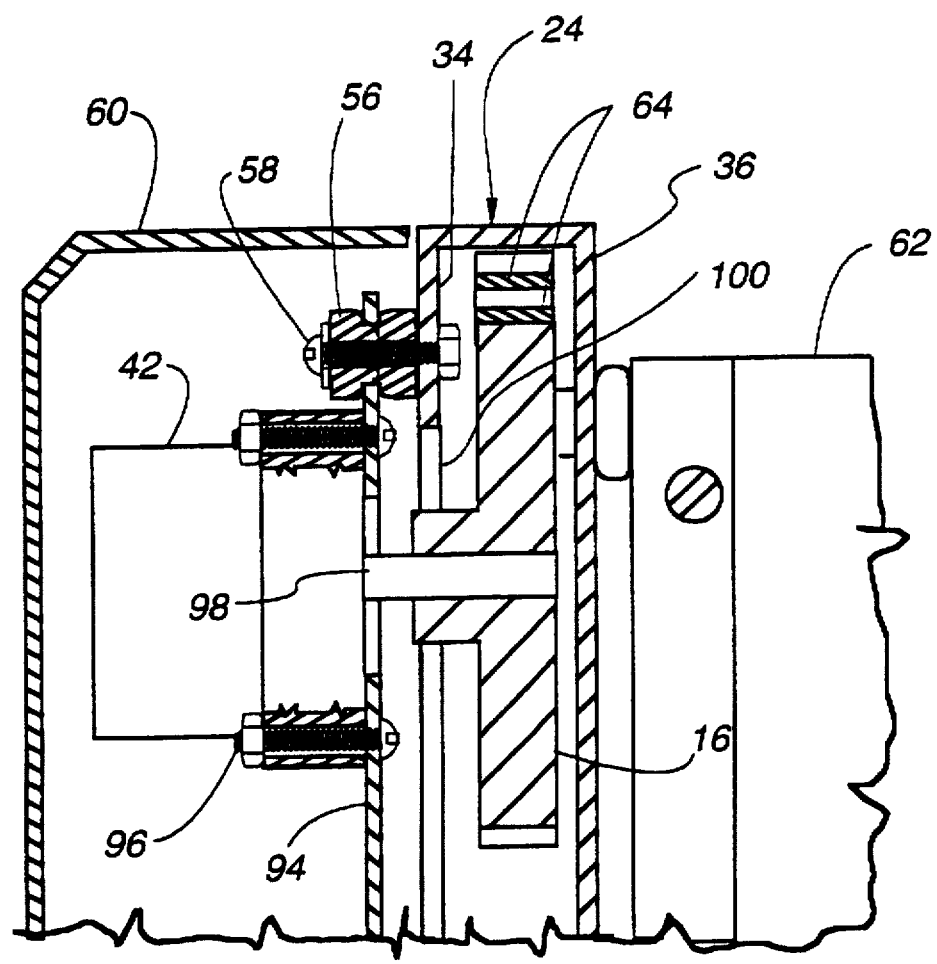
FIG. 5A is an enlarged partial sectional view of the motor housing showing mounting details of the stepper motors.

The stepper motors 42 are mounted to housing 24 through sound isolation grommets 56 via screws 58 as shown in FIG. 5A. The outer cover 60 over the motors 42 and the printed circuit board 44 is also sound isolation mounted to the rectangular housing 24. Two right angle brackets (not shown) are fastened to the housing 24 with four additional grommets 56 and bolts 58 (not shown). The cover 60 is in turn screwed to each of the brackets.

The outer cover 62 for the cooling fan 50 is similarly sound isolation mounted. The outer cover 62 is screwed to a pair of angle brackets which are in turn fastened to the housing 24 via four additional isolation grommets 56 and screws 58.

Each of these grommets is preferably made of a rubber, such as silicon rubber, or other elastomeric material, and has a double headed spool shape with a central bore through which the screw 58 passes. The grommet 56 is press fit into a properly sized hole in the "L" shaped angle bracket and then the angle bracket is positioned on the housing 24. The screw 58 is then passed through the central bore and threaded into the housing 24. The covers 60 and 62 are then fastened, typically with screws, onto the brackets.

The stepper motors 42 generate a substantial amount of vibration and noise during operation. The sound dampening mount for the motors and the covers 60 and 62 prevent most of this motor and drive mechanism noise from being transmitted from the apparatus of the invention. Such noise transmission is distracting to a theatrical audience and thus very undesirable. Therefore noise reduction is emphasized in a theatrical spotlight accessory such as the gobo handler of the present invention.

The drive mechanism 28 in the first embodiment of the invention is best shown in the longitudinal sectional view through the housing 24 shown in FIG. 3. The drive mechanism 28 preferably comprises a pair of endless toothed belts 64, each driven by a drive gear 66, and guided along the length of the housing 24 adjacent the top and bottom walls 36 and 38 in a guide member 68 having a pair of opposing channels. Each of the endless belts 64 is routed around an idler wheel 70 adjacent the drive gear 66, through one channel of the guide sleeve 68 facing one of the top or bottom walls, around a set of three idler wheels 72, 74 and 76, then through the other guide channel in the guide sleeve 68 back to the drive gear 66.

The guide member 68 is an elongated extrusion of high temperature resistant, low friction, generally rigid material, such as duPont nylon 6/6 or Teflon. As is best shown in the sectional view of FIG. 7, the guide member 68 has a generally "H" shaped cross section forming an upper channel 78 and a lower channel 80 joined by central portion 82.

The upper channel 78 is formed between central portion 82 and spaced upwardly extending parallel walls 84. The lower channel 80 is formed by central portion 82 and spaced downwardly extending parallel walls 86. The endless, preferably toothed belt 64 rides in these channels with the teeth facing away from the central portion 82. The walls 84 and 86 of the guide 68 are preferably parallel and coextensive, but may be offset to accommodate any particular belt design or gobo carrier design. Each of the lower walls 86 has an inwardly directed cantilevered lip or ledge 88 extending orthogonally to the wall 86 toward an opposite ledge 88, forming a gap 90 between the walls 86. The edges of these ledges facing each other act as lateral bearing surfaces to guide the translation of the gobo carriers as will be further described below. In addition, these ledges cooperate to retain the endless belt 64 in the lower channel 88.

The guide member 68 is preferably held in place against the top wall or the bottom wall by the ribs 40. The guide member 68 may be longitudinally secured in the housing 24 with a set screw (not shown) through the front wall 32 or back wall 34 into the central portion 82 of the guide member 68. The length of the guide member 68 is partially determined by the distance between the drive gear 66 and the idler wheel 72 at the other end of the housing 24 and partially by the number of gobos for which the housing 24 is designed to carry, e.g. three in the preferred embodiment shown in FIGS. 1–10.

Figure 7:
FIG. 7 is a partial sectional view of the apparatus shown in FIGS. 1 through 3 taken along the line 7—7 in FIG. 3.

Optionally, the guide 68 may include ledges 88 on the upper walls 86 as shown by the dashed lines in FIG. 7. This arrangement would make the guide orientation interchangeable in the housing 24 and would simplify installation and repair efforts as well as minimize potential handling errors during apparatus assembly. Alternatively, the upper walls 84 may be shortened in height if necessary for those design situations where overall width of the housing 24 (distance between upper and lower is limiting.

The guide cross section may also be other than an "H" shape when an endless belt 64 having a different shape is used. For example, the belt 64 might have a circular cross section. In this instance, the upper and lower channels of the guide would preferably have a curved, "C" shape cross section. The basic functions of the guide, however, remain the same, e.g., guiding the belt and reducing sliding friction between the belt and the guide.

The endless belts 64 are preferably flat toothed belts having standard ⅕ pitch teeth. Each belt is currently preferably made of silicone rubber, but other flexible rubber or plastic materials may alternatively be used. In addition, the belt may include reinforcing fibers or other embedded materials to improve longitudinal dimensional stability and/or provide selective rigidity to the teeth.

The toothed drive gear or pulley 66 is preferably made of aluminum or may be made of a rigid plastic material, and has peripheral teeth correspondingly matching the teeth on the belt 64. The perimeter of the drive pulley 66 is tangentially aligned with the lower channel 80 of the guide 68 so that the belt 64 enters straight into the guide 68. The drive pulley 66 is keyed to the output shaft of the stepper motor 42 and extends into the housing 24 so as to also be positioned in line with the adjacent idler pulley 70. This idler pulley 70 is bearing supported between the walls 32 and 34 on a fixed axle 92 which is in turn fastened to the walls 32 and 34. The idler pulley 70 is closely spaced from the drive pulley 66 to aid in maintaining tooth to tooth engagement between the belt 64 and the drive pulley 66. The idler pulley 70 is also sized and placed so that its perimeter is tangent to a straight line through the upper channel 78 of the guide member 68 so that the belt enters the guide 68 in a straight line to minimize friction and wear.

At the other end of the housing 24, there are three idler pulleys or wheels 72, 74, and 76. These idler pulleys are bearing supported in the housing 24 between walls 32 and 34 on fixed axles 92 as is idler pulley 70 above described. Idler pulley 72 is shown in FIG. 3 having teeth matching the teeth on the belt 64. The teeth on this idler pulley are optional and may be dispensed with, as the pulley serves no drive function. The pulley 72 is positioned so that its perimeter is tangent to a straight line through the lower channel 80 so that the belt 64 enters and leaves this channel with minimal friction. Idler pulley 74 is similarly positioned with respect to the upper channel 78 so that the belt 64 enters or leaves the upper channel 78 in a straight line to minimize friction and wear. The final idler pulley 76 is mounted in the housing 24 toward the opposite top or bottom wall of the housing 24. This pulley 76 is rotatably mounted on a fixed axle 92 as are the other idler pulleys. This pulley 76 may be optionally mounted on a movable axle which rides in a slot in the walls 32 and 34 and which is spring biased toward the opposite top or bottom wall in order to compensate for any lengthening or shortening of the belt 64 and provide a predetermined amount of tensioning of each of the belts.

The stepper motors 42 are conventional in design and operation. The mounting details of the stepper motors are best shown in the sectional view of the apparatus 10 shown in FIG. 5A. Each stepper motor 42 is bolted to a support plate 94 via four machine screws 96. The stepper motor shaft 98 extends through an opening 100 in the rear wall 34 into the housing 24. As discussed above, the support plate 94 is mounted to the wall 34 of the housing 24 via rubber grommets 56 to provide sound isolation of the motors.

The stepper motors 42 are remotely controlled typically from the theater lighting control board. However, there are circumstances where local control is necessary, such as during calibrations. Therefore, associated local control components are mounted on a printed circuit board 44 which is bolted to the housing 24 via standoffs adjacent the stepper motors 42. The motor cover 60 has several holes therethrough (not shown) for access to dip switches and control potentiometers located on this circuit board 44. The circuit board 44 is mounted on standoffs so that the controls are readily accessible through the holes.

The gobos 26 are each removably mounted in a gobo carrier 102. The gobo carrier 102 is an annular disc shaped body having front and rear faces and preferably made of sheet metal stock such as aluminum or steel capable of withstanding the high temperatures in the spotlight beam. The carrier has a central circular aperture 104, a recessed annular portion 106 around the aperture 104 for receiving the gobo 26, a circular rim portion 108 having teeth 110 projecting radially outward to engage the endless belt 64 of the drive mechanism 28, and a plurality of retainers 112 on the recessed portion 106 spaced preferably symmetrically around the recessed portion 106.

The carrier 102 preferably has an outer diameter of about 4 inches. The central aperture is about 3 inches in diameter. The recessed portion 106 has an outer diameter of about 3¼ inches and is recessed from the rim portion 108 by about 0.020 inches. Since most metal gobos 26 range between about 0.005 to 0.012 inches thick, the recess easily accommodates metal gobos. Glass gobos, on the other hand, are much thicker, on the order of 0.050–0.125 inches and typically about 0.080 inches thick. A glass gobo is shown installed in FIGS. 3, 4, 5, 6 and 8B for clarity. Obviously, the metal gobos 26 would be illustrated much thinner than those illustrated here.

Figure 8A:
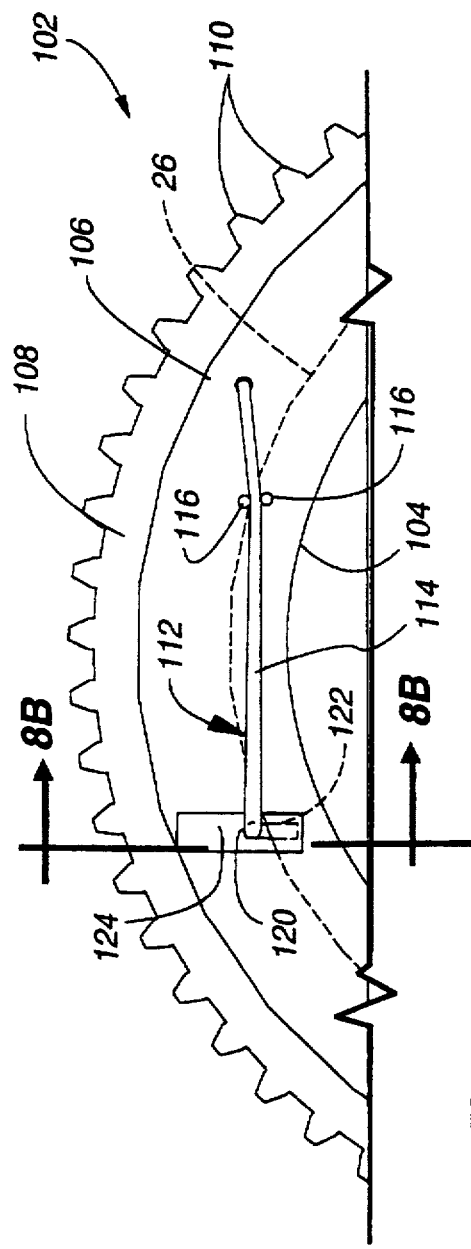
FIG. 8A is a partial plan view of a gobo carrier separate from the apparatus in FIGS. 1–3.
Figure 8B:
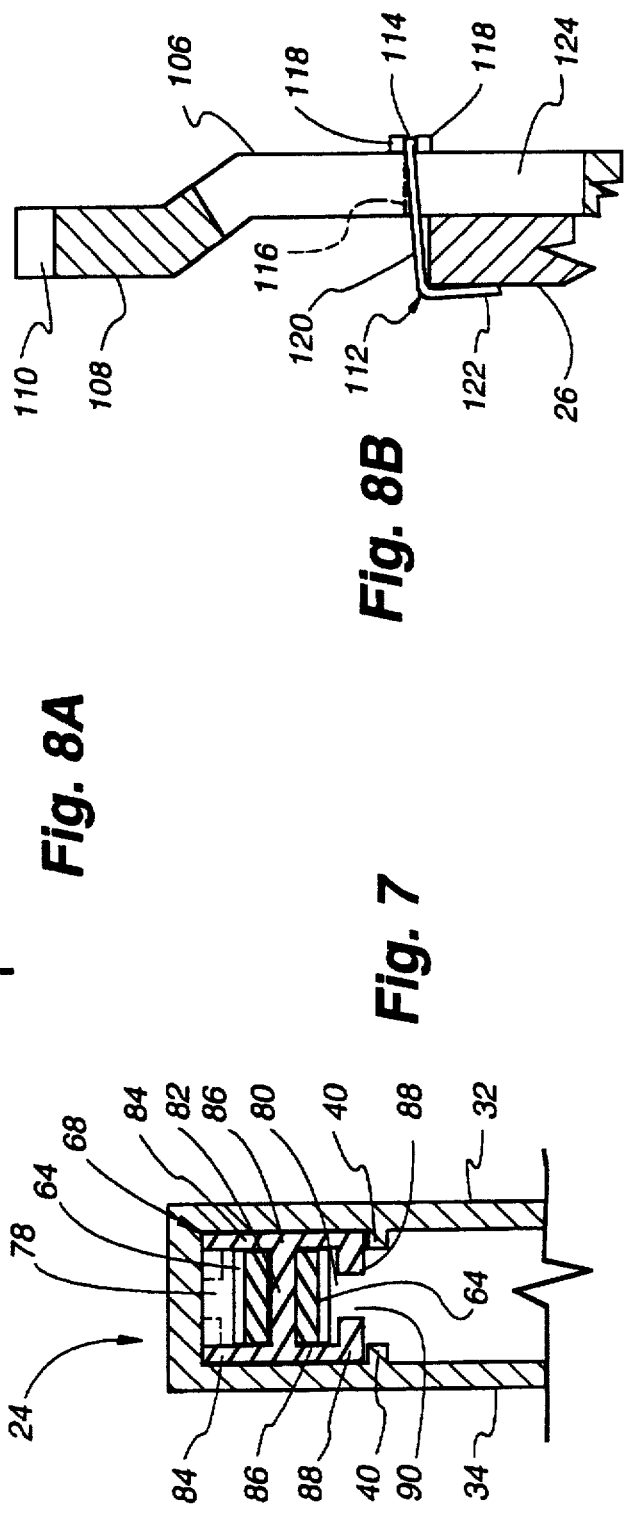
FIG. 8B is a sectional view of the gobo carrier shown in FIG. 8A taken along the line 8B—8B.

The gobo carrier 102 is shown in greater detail in FIGS. 8A and 8B. The recessed portion 106 has three retainers 112 spaced 120° apart around the central aperture 104. Each of the retainers 112 includes a spring rod 114 lying along the rear face of the recessed portion 106. The rod 114 has one end bent at a right angle and pressed into and fastened in an anchor bore 116 through the recessed portion 106. The central portion of the rod 114 passes between a pair of fulcrum posts or rivets 118 pressed into holes in the rear surface of the recessed portion 106. The free end 120 of the spring rod 114 has two right angle bends forming a hook 122 at the end of the rod so that the free end 120 extends through an elongated slot 124 through the recessed portion 106. The hook 122 captures an edge of the gobo 26 as shown in FIG. 8B. The fulcrum rivets 118 are placed such that the spring rod 114 is biased toward the center of the carrier 102. Since the retainers 112 are 120° apart, when a gobo 26 is placed in the recessed portion 106 and the hooks 122 of the three retainers 112 engaged over the edge of the gobo, the gobo 26 is automatically centered in the carrier 102 and securely held in place. The spring rod 114 is preferably made of steel. The fulcrum rivets 116 may be steel or aluminum and are press fit into corresponding holes in the recessed portion 106. The end of the rod 114 passing through the bore 116 may be staked in place with a rivet or may extend outward to form a guide pin for a light guard as will be more fully described below with reference to FIGS. 9 and 10.

Referring now to FIG. 3, three gobos 26 are shown mounted in three carriers 102 in the apparatus 10 in accordance with the first embodiment of the invention. The gobo carriers 102 are preferably permanently installed in the housing 24 during assembly of the apparatus 10. Different pattern gobos 26 may be installed through the larger gobo access aperture 52 in the rear wall 34 when the apparatus 10 is removed from the spotlight 12 simply by prying back the hooks 122 on the retainers 112 to release the gobo 26. A new gobo may then easily be installed and automatically centered by use of these retainers 112.

The apparatus 10 includes a cooling fan 126 mounted on the housing 24 via elastomeric grommets 56 for sound isolation on the front wall 32 of the housing 24, opposite the stepper motors 42. The housing 24 includes a generous opening 128 through the front wall 32. The fan cover 62 has a plurality of openings 130 for air entry through the opening 128 into the apparatus housing 24. The fan 126 draws outside air into the housing directs this air out the open ends of the housing and out through the central aperture 30 thereby cooling the drive mechanism 28 and the gobos 26. The difference in temperatures with and without the fan are dramatic. Without the fan 126, temperatures adjacent the aperture 30 reach several hundred degrees Fahrenheit. With the fan operating, the temperatures at the same location are around 80 degrees Fahrenheit. Thus operating the fan 126 results in lower operating temperatures which prolongs the life of the gobos 26 and apparatus subcomponents such as the belts 64 and other polymeric materials.

Figure 9:
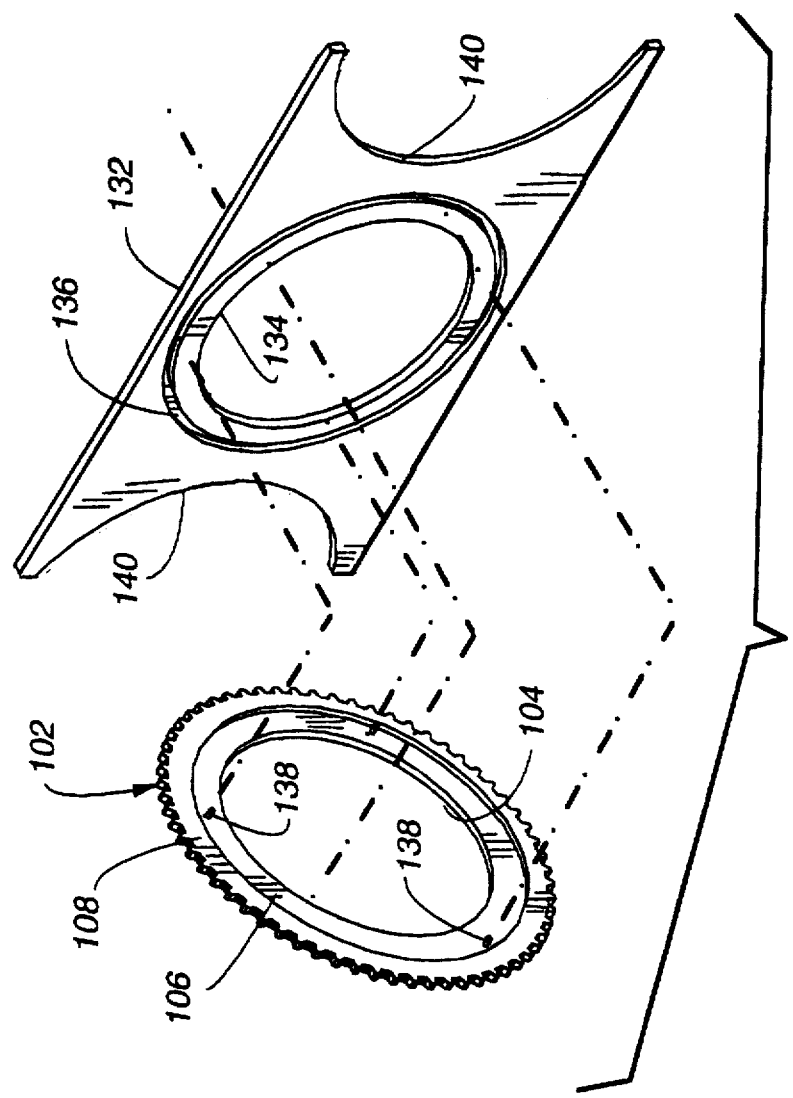
FIG. 9 is an exploded perspective view of a light guard and a gobo carrier.
Figure 10:
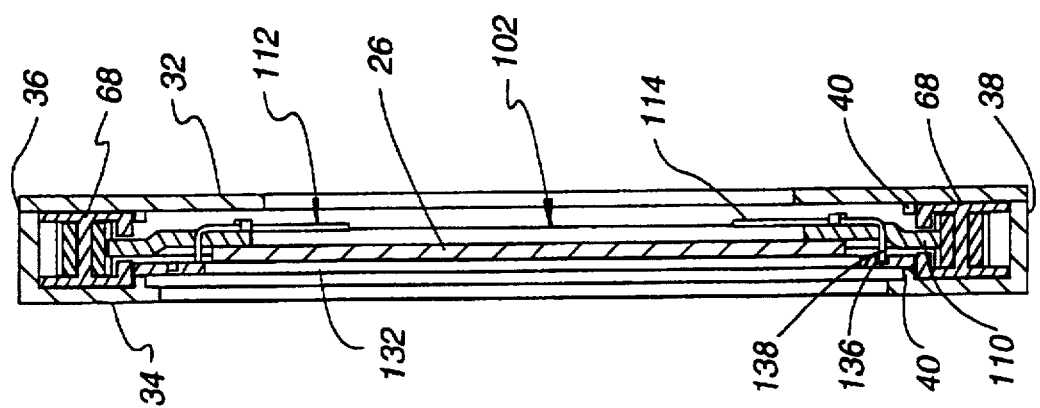
FIG. 10 is a sectional view of the apparatus of the invention as shown in FIG. 5 with the guard shown in FIG. 9 installed in the apparatus.

Referring now to FIGS. 9 and 10, the center gobo carrier 102 shown in FIG. 3 preferably supports and moves a light guard 132 horizontally as the gobo carrier 102 is translated along the axis A of the housing 24 via the drive mechanism 28. The light guard 132 is designed to prevent light from passing to the lens 18 when two adjacent carriers are in the light beam as a gobo is moved horizontally through the beam. The light guard 132 is an elongated, generally flat, sheet metal or plastic body that slides along either the ribs 40 or the ledges 88 of the guide member 68 as is shown in the sectional view of FIG. 9. The light guard 132 has a central circular aperture 134 sized slightly larger than the gobos 26 to permit removal and insertion of gobos 26 through the rear gobo access aperture 52 in the rear wall 34 of the housing 24. The aperture 134 preferably has a radius that is smaller than the radius of the anchor bores 116 in the carrier 102 but larger than the largest anticipated gobo 26 anticipated to be used in the apparatus 10.

The guard 132 has a concentric groove 136 around the aperture 134 at the radius of the anchor bores 116. The captured ends of the spring rods 114 of the retainers 112, described above, preferably extend clear through the bores 116 to form projecting aligning pins 138 which fit into the groove 136. Thus when the guard 132 is installed on the rear face of the center gobo carrier 102, the pins 138 are free to ride in the groove 136 as the carrier 102 is rotated or translated along axis A by the drive mechanism 28. When the gobo carrier 102 is translated along the axis A, either separately or simultaneously with rotation of the carrier 102, the pins 138 engaging the groove 136 drag the guard along with the carrier 102. This ensures that the guard 132 remains constantly in alignment with the center carrier 102. The pins 138 may be separate pins embedded in the recessed portion 106 of the carrier 102, however, use of the captured ends of the spring rod 114 to form these pins is preferred in order to simplify construction.

The guard 132 has oppositely concave curved end portions 140 which preferably only overlie the adjacent halves of the rim portions 108 of the gobo carriers 102 adjacent the center gobo carrier 102. These end portions prevent light passing through the housing 24 while the teeth 110 of the center carrier 102 and an adjacent carrier 102 pass within the aperture 30.

Although the first embodiment 10 is shown with an endless belt drive mechanism, there are a number of drive mechanisms that are also contemplated for use in the apparatus of the invention. For example, a linear motor arrangement may be used or a parallel lead screw arrangement may be used, driven by a stepper motor or servo motor system.

A second embodiment 200 of the gobo handling apparatus, using a lead screw arrangement, is shown in FIGS. 11 through 15. Like numbers are used here to describe interchangeable components from the first embodiment previously described. This second embodiment 200 of the invention is also designed for use in an iris slot 20 of a conventional ellipsoidal spotlight 12 as previously described. Hence the spotlight 12 is not illustrated in FIGS. 11 through 15 as the reader may simply refer to FIGS. 1, 2, and 4 as appropriate.

This second embodiment 200 comprises an elongated hollow tubular housing 202 made in two longitudinal halves and having a central aperture 204 therethrough, a plurality of gobo carriers 102 in the housing 202, and a drive mechanism 208 disposed in the housing 202 for translating and rotating the gobo carriers 102.

Figure 11:
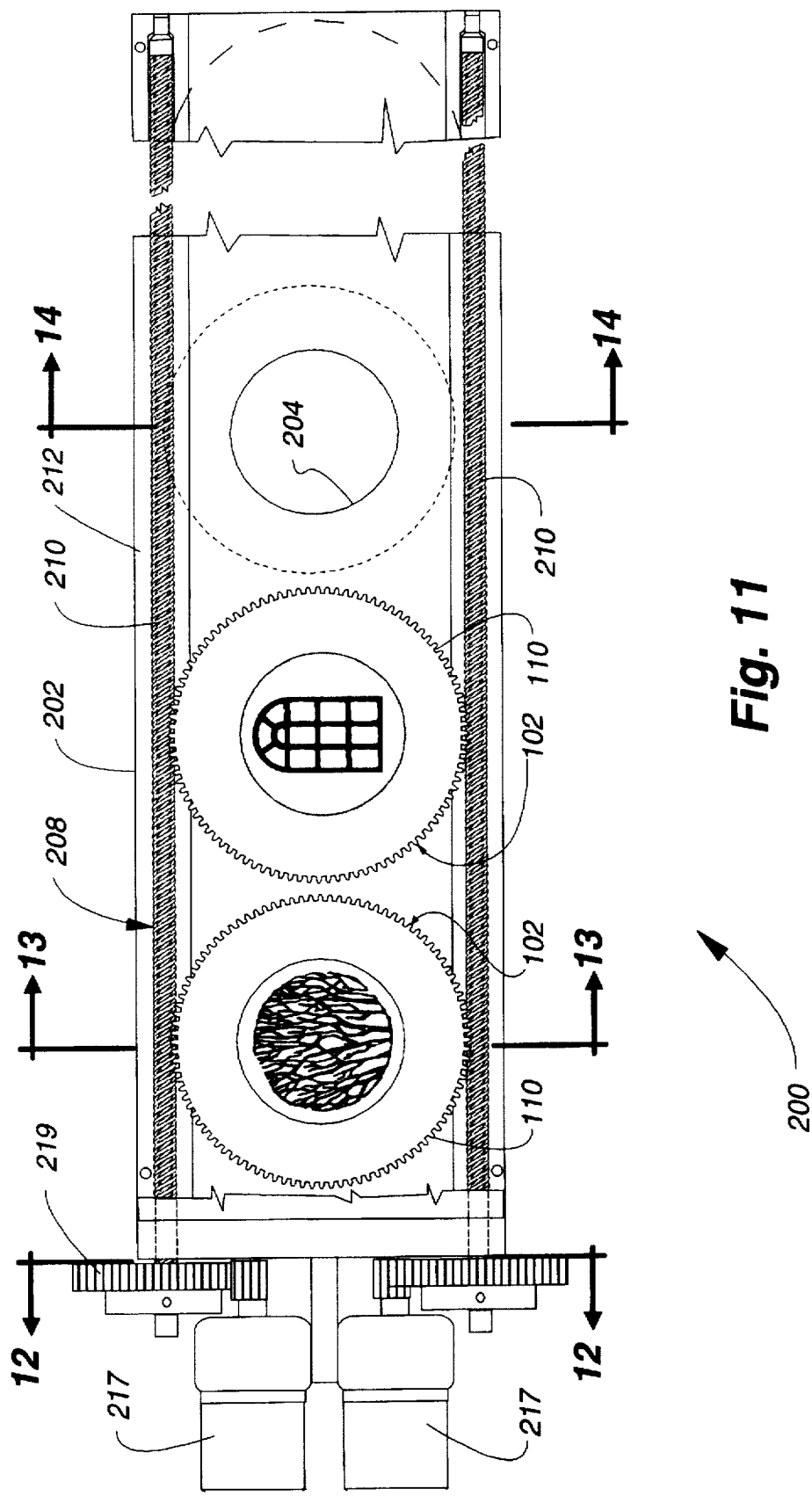
FIG. 11 is a plan view of a second embodiment of the gobo handling apparatus in accordance with the invention with a top portion of the apparatus housing removed to reveal the drive mechanism components inside.

The drive mechanism 208 comprises a pair of lead screws 210 bearing supported in the housing 202 above and below the gobo carriers 102. Each of the lead screws 210 has a ⅕ pitch thread complementarily engaging the teeth 110 on the rim portion 108 of the gobo carrier 102. The lead screws 210 may be supported in a nylon or Teflon channel 212 fastened in place in the housing 202 as is the guide 68 in the first embodiment, or, the housing 202 may be formed in two halves, with the channel 212 integrally formed in the housing 202. In this latter case, the curved surface of the channel 212 would be coated with Teflon or other low friction material if the housing 202 is made of metal such as aluminum. FIG. 11 shows this latter configuration with the top half of the housing removed.

In the second embodiment illustrated, one drive motor 217 is connected to each lead screw through a reduction gear 219. It is to be understood that other connections may be made without reduction gears if low speed motors such as steppers are used. The two drive motors 217 must be synchronized to accurately position the gobos 26 in the aperture 204 and to translate the gobos 26 without rotation, as in this instance both lead screws must rotate together at the same rate. The drive motor configuration, along with the fan 50 and printed circuit board 44 of the first embodiment 10, may be substituted for the drive motors shown here. In this case, the stepper motors would preferably be geared directly to the lead screws rather than through reduction gearing.

Figure 14:
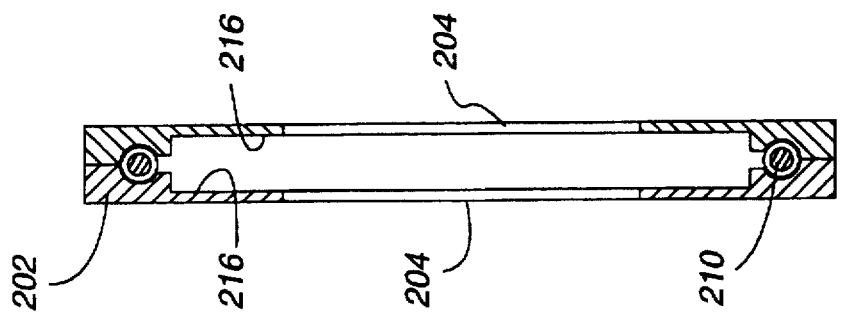
FIG. 14 is a sectional view of the second embodiment of the invention taken along the line 14—14 in FIG. 11.
Figure 13:
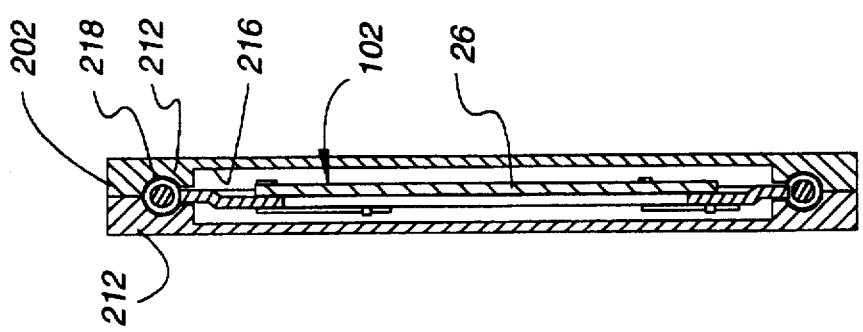
FIG. 13 is a sectional view of the second embodiment of the invention taken along the line 13—13 in FIG. 11.
Figure 12:
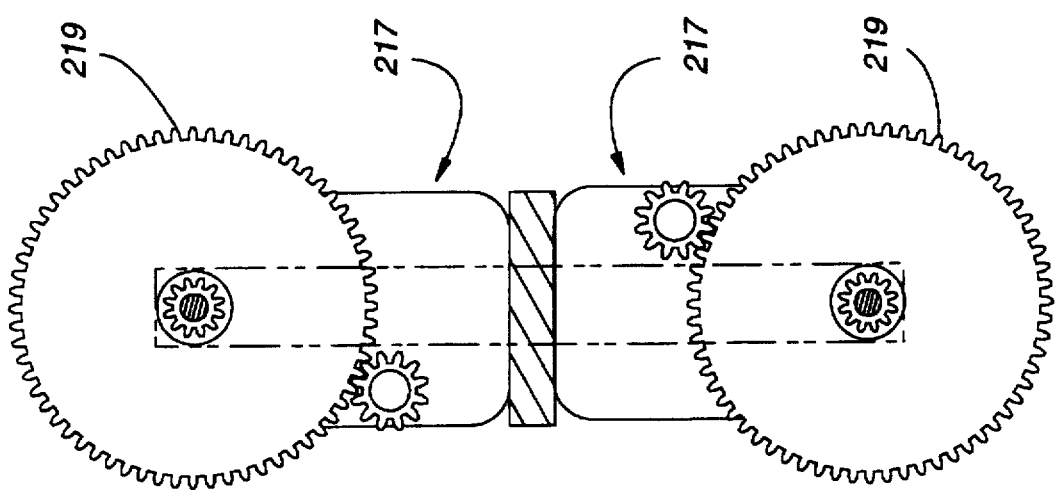
FIG. 12 is a sectional view of the second embodiment taken along the line 12—12 in FIG. 11.

As is shown in the sectional views of FIGS. 13 and 14, the housing 202 comprises two halves 212 joined together by machine screws (not shown). Each half housing has a central channel 216 for the gobo carriers 102 and a pair of lead screw channels 218, each having a semicircular cross section, above and below the central channel 216. Construction and operation of the gobo carriers 102 and the light guard 132 are the same as previously described. However, in this second embodiment 200, the light guard rides along the upper and lower sides of the central channel 216 rather than in the guide gap 90 or along the ribs 40 in the first embodiment 10.

Figure 15:
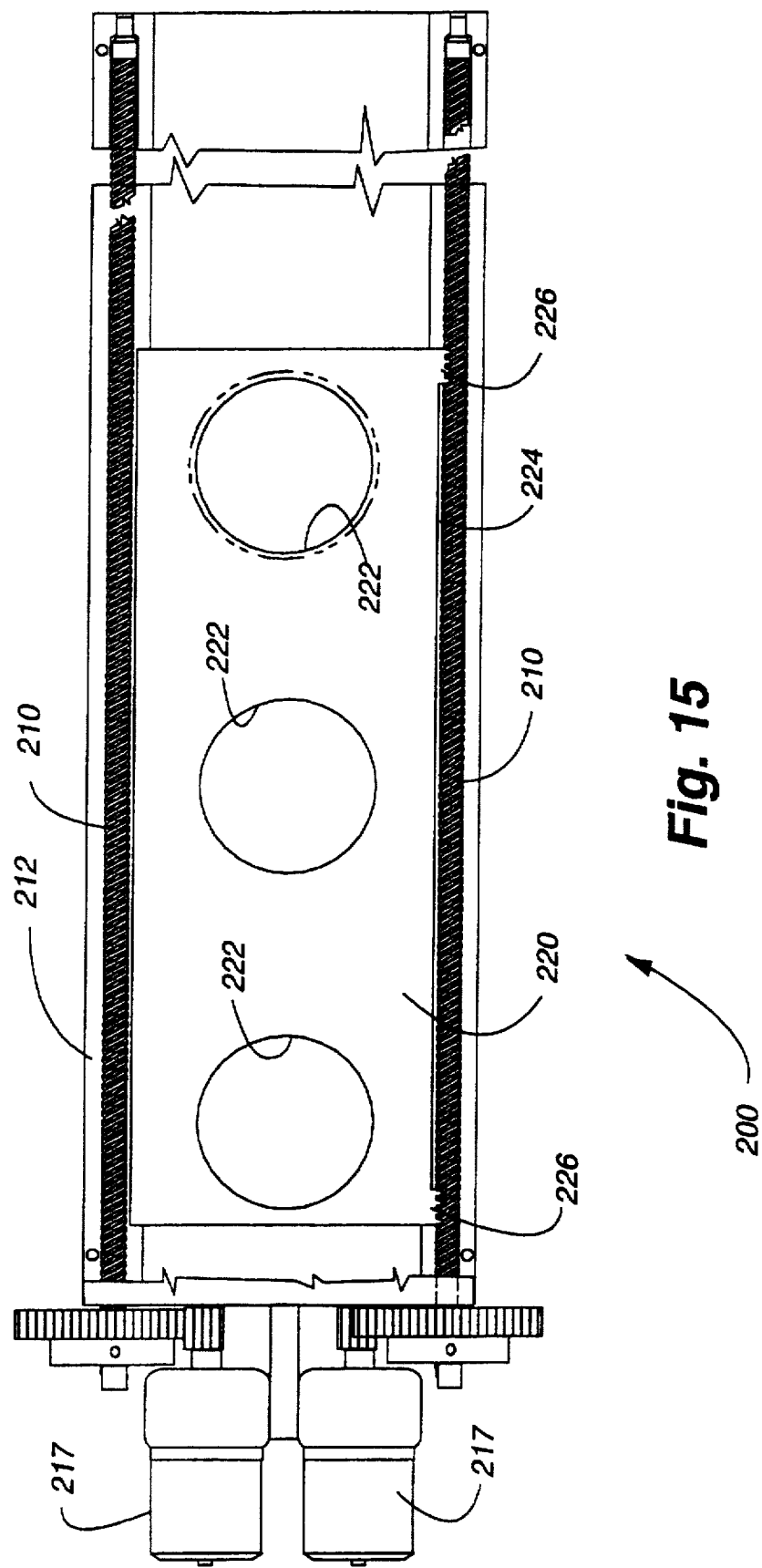
FIG. 15 is a plan view as in FIG. 11 with a multiple gobo carrier in accordance with another aspect of the invention installed in place of separate carriers for each gobo filter.

Referring now to FIG. 15, an alternate gobo carrier design is illustrated which may be used in the second embodiment 200. This carrier 220 only translates the gobos and does not rotate them. The carrier 220 is basically a rectangular plate having a plurality of apertures 222 therethrough for the gobos and retainers 112 arranged around the apertures 222. Retention of the gobos 26 in the carrier 220 is the same as above described with reference to the first embodiment, with three retainers 112 positioned 120 degrees apart around each of the apertures.

At each end, along the lower edge 224 of the carrier 220 are arranged two sets of teeth 226 which engage the threads of the lower lead screw 210. This carrier may be installed as shown or may be flipped over so that the teeth 226 engage the upper lead screw 210. In either case, only the drive motor connected to lead screw engaged with the carrier needs to be operated in order to translate the gobo carrier. This arrangement may be preferable when rotation of the gobos is not required, and simplifies the control scheme since the motors need not be synchronized.

There are a number of modifications and variations which may be made to the apparatus of the invention. For example, as previously mentioned, different drive motor schemes may be utilized in the various embodiments. Stepper motors are preferred, however, because of their precise control. Their main drawback is noise generated by the step motion. This is primarily compensated for by sound isolation mounting the stepper motors and covers as described above. Servo motors may be used also, because they are relatively quiet. However, as servos utilize analog signals, they are inherently less precise than steppers. Different drive mechanisms may be used, such as endless belts of various shapes, gear and pulley arrangements, and lead screws, of which the second embodiment illustrated is an example.

The light guard 132 may be longer and have a plurality of holes corresponding to adjacent gobos. This variation would be particularly applicable if more than four gobo carriers are to be accommodated in the housing 24. An automatic gobo carrier stack loading mechanism may also be fastened to the housing over an extra access opening to accommodate a larger number of gobos than the three contemplated in the straight line embodiments illustrated here. Accordingly, it is intended that the present invention, as defined by the following claims, include all such alternatives, modifications, and chances apparent to those skilled in the art. All patents, patent applications, and printed publications referred to herein are hereby incorporated by reference in their entirety.

What is claimed is:

1. A gobo handling apparatus for use in a spotlight having a spotlight housing supporting a light source producing a light beam, said spotlight having a slot through said housing proximate a focal plane of said light beam, said apparatus comprising:

an elongated gobo housing removably inserted in said slot, said gobo housing having a central axis and an aperture therethrough for passage of a light beam therethrough in a direction normal to said axis;

a plurality of generally disk shaped gobo members arranged side by side and movably contained within said housing; and a drive mechanism contained within said housing operatively engaged with each of said plurality of gobo members for independently translating said gobo members along said axis into and out of said spotlight beam and rotating said gobo member in said spotlight beam in response to a remote control signal.

2. The apparatus according to claim 1 wherein each of said gobo members is supported by and centered in a carrier having an annular disk shape, said carrier having a peripheral rim portion engaging said drive mechanism and a plurality of retainers on said carrier removably fastening and centering said gobo member in said carrier.

3. The apparatus according to claim 2 wherein said drive mechanism comprises a pair of lead screws rotatably mounted parallel to said central axis in said housing adjacent opposite edge portions of said carriers engaging teeth on said rim portion of said carrier.

4. The apparatus according to claim 3 wherein each of said lead screws is connected to a motor fastened to said housing for rotating said lead screws independently of each other.

5. The apparatus according to claim 3 wherein said lead screws are rotationally synchronized to translate said carriers together along said central axis.

6. The apparatus according to claim 2 wherein said housing further comprises a pair of elongated guide members disposed in said housing, each of said guide members engaging a rim portion of each of said carriers to align said carriers side by side in said housing.

7. The apparatus according to claim 6 wherein each said guide member is an elongated polymeric body having a pair of spaced sides forming an open channel receiving a rim portion of said carrier and supporting a portion of said drive mechanism.

8. The apparatus according to claim 7 wherein said guide member further comprises another pair of spaced sides forming another channel guiding another portion of said drive mechanism, said guide member having a generally "H" shaped cross section.

9. The apparatus according to claim 7 wherein said drive mechanism includes an endless belt engaging said rim portion of said carrier and disposed in said upper channel in each of said guide members, a drive wheel engaging each of said belts adjacent one end of each of said guide members and an idler wheel adjacent an opposite end of each guide member over which said belt rides.

10. The apparatus according to claim 9 wherein said endless belt has a plurality of teeth and each of said carriers has correspondingly shaped teeth around said rim portion.

11. The apparatus according to claim 9 wherein said drive wheel has teeth matching said plurality of teeth on said endless belt.

12. The apparatus according to claim 9 further comprising a drive motor fastened to said housing connected to said drive wheel.

13. The apparatus according to claim 12 wherein said drive motor is fastened to said housing through a vibration damping member to sound isolate said motor from said housing.

14. A gobo carrier for movably supporting a gobo member in a light beam of a spotlight, said carrier comprising:

a generally disk shaped carrier body having a front face, a rear face, a central aperture through said body, an annular recessed portion around said aperture adapted to receive a gobo member therein, and a generally circular rim portion around said recessed portion; and a plurality of gobo retainers fastened to said recessed portion for engaging and retaining said gobo in said recessed portion.

15. The carrier according to claim 14 wherein said rim portion has a plurality of teeth spaced around said rim portion.

16. The carrier according to claim 14 wherein said plurality of retainers are equally spaced apart on said recessed portion around said aperture.

17. The carrier according to claim 16 wherein three retainers are spaced around said aperture on said recessed portion.

18. The carrier according to claim 14 wherein each of said retainers comprises an elongated rod member having one end fastened to said recessed portion of said disk and an opposite free end extending through a slot through said recessed portion of said body to engage a rim of said gobo member.

19. The carrier according to claim 18 wherein said free end is spring biased toward said central aperture.

20. The carrier according to claim 19 wherein a portion of said rod proximate said fastened end is captured between a pair of fulcrum posts fastened to said rear face of said carrier body.

21. A gobo handling apparatus for use in a spotlight having a spotlight housing supporting a light source producing a light beam, said spotlight having a slot through said housing proximate a focal plane of said light beam, said apparatus comprising:

an elongated gobo housing removably inserted in said slot, said gobo housing having a central axis and an aperture therethrough for passage of a light beam therethrough in a direction normal to said axis;

a plurality of generally disk shaped gobo members arranged side by side and movably contained within said housing; and a drive mechanism contained within said housing operatively engaged with each of said plurality of gobo members for independently translating said gobo members along said axis into and out of said spotlight beam in response to a remote control signal.

* * * * *